US012678929B2

(12) United States Patent
Young et al.

(10) Patent No.: US 12,678,929 B2
(45) Date of Patent: Jul. 14, 2026

(54) POWER TOOL WITH ACCESSORY ATTACHMENT MOUNT AND ACCESSORY THEREFOR

(71) Applicant: Ingersoll-Rand Industrial U.S., Inc., Davidson, NC (US)

(72) Inventors: Randi J. Young, Randolph, NJ (US); Graham Ginder, W Easton, PA (US); Lawrence R. Carmen, Jr., Bath, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/920,505

(22) Filed: Oct. 18, 2024

(65) Prior Publication Data

US 2025/0128396 A1 Apr. 24, 2025

Related U.S. Application Data

(60) Provisional application No. 63/592,363, filed on Oct. 23, 2023.

(51) Int. Cl.
| | |
|---|---|
| *B25F 5/02* | (2006.01) |
| *B25F 5/00* | (2006.01) |

(Continued)

(52) U.S. Cl.
CPC ............... *B25F 5/02* (2013.01); *F21V 23/06* (2013.01); *F21V 33/0084* (2013.01); *G06K 7/1413* (2013.01); *H04N 23/54* (2023.01)

(58) Field of Classification Search
CPC ........ B25F 5/02; F21V 23/06; F21V 33/0084; H04N 23/54; G06K 7/1413
See application file for complete search history.

(56) References Cited

U.S. PATENT DOCUMENTS

| | | | | |
|---|---|---|---|---|
| D454,040 S | * | 3/2002 | Wadsworth | ...................... D8/61 |
| 6,364,580 B1 | * | 4/2002 | Dils | ........................ B25F 5/029 |
| | | | | 408/16 |

(Continued)

FOREIGN PATENT DOCUMENTS

| | | | |
|---|---|---|---|
| CN | 108495736 A | 9/2018 | |
| WO | WO-2020146696 A1 * | 7/2020 | .......... H02J 7/00032 |
| WO | 2023076446 A1 | 5/2023 | |

OTHER PUBLICATIONS

Extended European Search Report from European Application No. 24208139.6, dated Apr. 8, 2025.

*Primary Examiner* — Lucas E. A. Palmer
(74) *Attorney, Agent, or Firm* — Kevin E. West; Advent, LLP

(57) ABSTRACT

A power tool assembly includes a drive mechanism, a longitudinally extending housing, an electrical connection at the housing for receiving electrical energy, and an attachment mount on the housing for releasably attaching a tool accessory to the power tool assembly. The attachment mount includes electrical connections for mating electrical connectors of the tool accessory to furnish power and/or data transfer between the power tool and the tool accessory. The attachment mount includes at least one rail configured for sliding contact with at least a second rail of the tool accessory to restrict movement of the tool accessory, and a latching mechanism for releasably securing the tool accessory to the attachment mount. A tool accessory for releasably attaching to a power tool assembly includes electrical connectors for mating with electrical connections of an attachment mount, at least one rail, and a receiver for receiving a latching mechanism of the attachment mount.

20 Claims, 21 Drawing Sheets

(51) Int. Cl.

| | |
|---|---|
| *F21V 23/06* | (2006.01) |
| *F21V 33/00* | (2006.01) |
| *G06K 7/14* | (2006.01) |
| *H04N 23/54* | (2023.01) |

(56) References Cited

U.S. PATENT DOCUMENTS

| | | | | |
|---|---|---|---|---|
| 6,502,949 | B1 * | 1/2003 | Horiyama | B23Q 17/2404 |
| | | | | 362/198 |
| D485,382 | S * | 1/2004 | Palm | D26/38 |
| 6,926,473 | B2 * | 8/2005 | Luebke | G01V 3/15 |
| | | | | 408/16 |
| 7,534,065 | B2 * | 5/2009 | Rejman | B25F 5/02 |
| | | | | 403/328 |
| 9,114,494 | B1 * | 8/2015 | Mah | B25H 1/0092 |
| 9,577,450 | B2 * | 2/2017 | Yoshikawa | H02J 7/342 |
| 11,212,909 | B2 * | 12/2021 | Smith | B25F 5/02 |
| 11,986,941 | B2 * | 5/2024 | Kadlecek | B25F 5/02 |
| 12,040,645 | B2 * | 7/2024 | Nitzschner | H02J 7/0029 |
| 2002/0054798 | A1 * | 5/2002 | Dils | G01V 3/15 |
| | | | | 408/124 |
| 2002/0125857 | A1 * | 9/2002 | Mastaler | H02J 7/0045 |
| | | | | 320/112 |
| 2004/0016058 | A1 * | 1/2004 | Gardiner | G01C 17/00 |
| | | | | 7/164 |
| 2005/0069391 | A1 * | 3/2005 | Dils | G01V 3/15 |
| | | | | 408/16 |
| 2005/0111214 | A1 * | 5/2005 | Zeiler | B25B 23/18 |
| | | | | 362/119 |
| 2005/0200087 | A1 * | 9/2005 | Vasudeva | B25F 3/00 |
| | | | | 279/143 |
| 2005/0247460 | A1 * | 11/2005 | Luebke | H01L 21/76829 |
| | | | | 173/2 |
| 2006/0220612 | A1 * | 10/2006 | Feldmann | B25F 5/022 |
| | | | | 320/114 |
| 2008/0135272 | A1 * | 6/2008 | Wallgren | H01M 50/202 |
| | | | | 173/217 |
| 2008/0196910 | A1 * | 8/2008 | Radle | B25F 5/00 |
| | | | | 173/2 |
| 2014/0151079 | A1 * | 6/2014 | Furui | B25F 5/02 |
| | | | | 173/171 |
| 2014/0159919 | A1 | 6/2014 | Furui et al. | |
| 2014/0240125 | A1 * | 8/2014 | Burch | B25H 3/02 |
| | | | | 340/539.13 |
| 2014/0259599 | A1 * | 9/2014 | Glaspell | B25B 21/00 |
| | | | | 29/407.04 |
| 2016/0048122 | A1 * | 2/2016 | Lukosz | G05B 19/4183 |
| | | | | 700/114 |
| 2017/0216986 | A1 * | 8/2017 | Dey, IV | B23D 51/16 |
| 2017/0222382 | A1 * | 8/2017 | Peloquin | H01R 27/02 |
| 2017/0259422 | A1 * | 9/2017 | Takeyama | B25F 5/029 |
| 2017/0282346 | A1 | 10/2017 | Valentini | |
| 2017/0361452 | A1 * | 12/2017 | Jatekos | B25F 5/021 |
| 2018/0054032 | A1 | 2/2018 | Peloquin et al. | |
| 2018/0281168 | A1 * | 10/2018 | Sergyeyenko | B25F 5/027 |
| 2019/0027002 | A1 * | 1/2019 | Esenwein | H04W 4/021 |
| 2019/0160646 | A1 * | 5/2019 | Hoossainy | H04W 64/003 |
| 2020/0094393 | A1 * | 3/2020 | Schadow | B25F 5/02 |
| 2020/0094394 | A1 * | 3/2020 | Schadow | B25F 5/02 |
| 2020/0306669 | A1 * | 10/2020 | Tada | B25F 5/00 |
| 2021/0205976 | A1 * | 7/2021 | Matei | G08B 7/06 |
| 2021/0384741 | A1 * | 12/2021 | Douglas | H02J 7/0044 |
| 2023/0241758 | A1 * | 8/2023 | Chu | B25H 1/0092 |
| | | | | 356/4.01 |
| 2024/0261954 | A1 * | 8/2024 | Politte | H01M 50/296 |
| 2024/0424652 | A1 * | 12/2024 | Albrecht | B25F 5/001 |
| 2025/0065486 | A1 * | 2/2025 | Bethards | F16M 13/02 |
| 2025/0073885 | A1 * | 3/2025 | Asahi | B25F 5/006 |
| 2025/0162112 | A1 * | 5/2025 | Zhang | A45F 5/021 |
| 2025/0256385 | A1 * | 8/2025 | Friedman | B25F 5/02 |

* cited by examiner

POWER TOOL WITH ACCESSORY ATTACHMENT MOUNT AND ACCESSORY THEREFOR

CROSS-REFERENCE TO RELATED APPLICATIONS

The present application claims the benefit under 35 U.S.C. § 119(e) of U.S. Provisional Application Ser. No. 63/592,363, filed Oct. 23, 2023, and titled "POWER TOOL WITH ACCESSORY ATTACHMENT MOUNT AND ACCESSORY THEREFOR," which is herein incorporated by reference in its entirety.

BACKGROUND

A power tool is a tool actuated by a power source other than manual labor.

DRAWINGS

The Detailed Description is described with reference to the accompanying figures. The use of the same reference numbers in different instances in the description and the figures may indicate similar or identical items.

FIG. 1 is an isometric view illustrating a power tool assembly and a tool accessory for the power tool assembly, where the power tool assembly includes a longitudinally extending housing for supporting and retaining a drive mechanism and a working tool element, an electrical connection at the housing for receiving electrical energy for the power tool assembly, and an attachment mount on the housing for releasably attaching the tool accessory to the power tool assembly; where the attachment mount protrudes outwardly from the housing and includes electrical connections for receiving mating electrical connectors of the tool accessory, rails extending along a plane generally parallel with respect to the longitudinal extension of the housing, the rails configured for sliding contact with rails of the tool accessory when the tool accessory is connected to the attachment mount, and a latching mechanism for releasably securing the tool accessory to the attachment mount; and where the tool accessory includes the electrical connectors, the tool accessory rails, and a receiver for receiving the latching mechanism of the attachment mount in accordance with example embodiments of the present disclosure.

Figure 4:
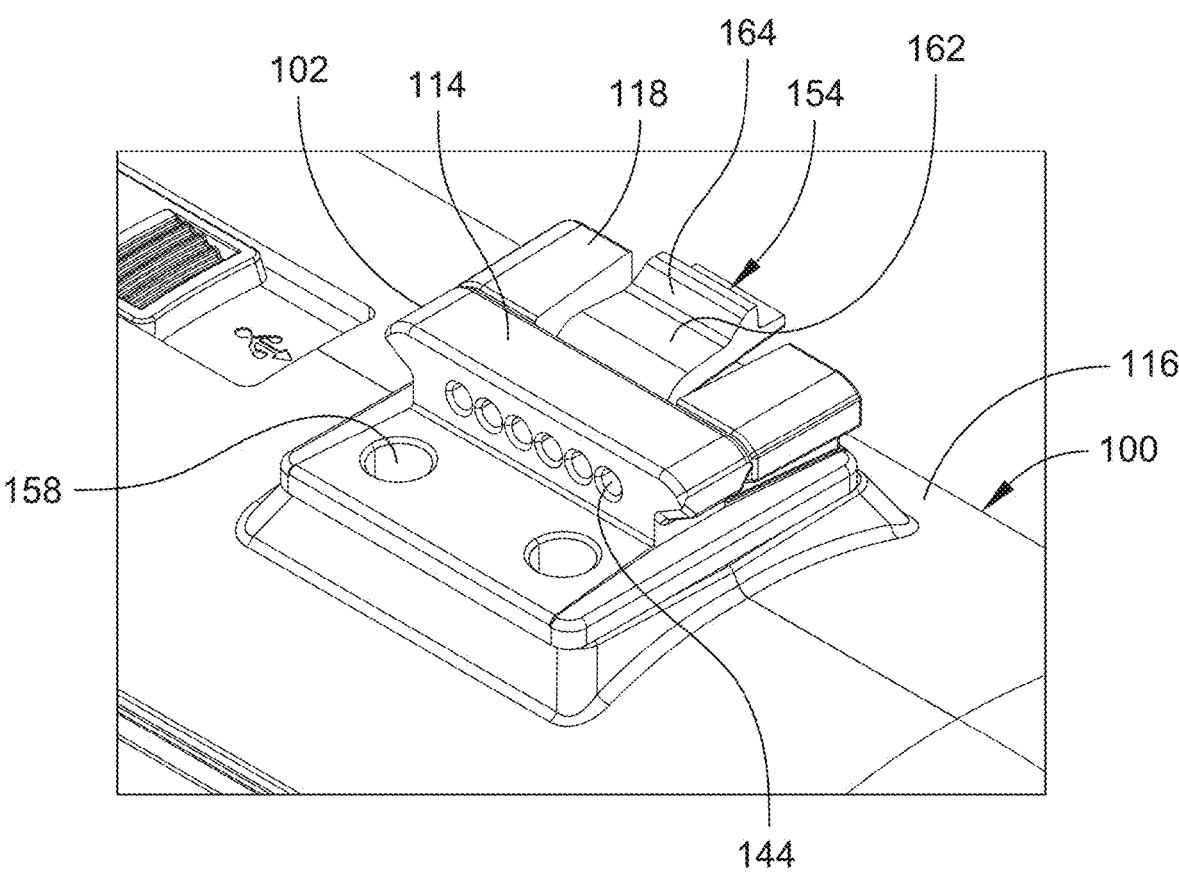

FIG. 4 is an isometric view illustrating an attachment mount on a housing of a power tool assembly for releasably attaching a tool accessory to the power tool assembly, where the attachment mount protrudes outwardly from the housing and includes electrical connections for receiving mating electrical connectors of the tool accessory, rails extending along a plane generally parallel with respect to a longitudinal extension of the housing, the rails configured for sliding contact with rails of the tool accessory when the tool accessory is connected to the attachment mount, and a latching mechanism for releasably securing the tool accessory to the attachment mount, and where the latching mechanism is reversible with respect to the electrical connections in accordance with example embodiments of the present disclosure.

Figure 5:
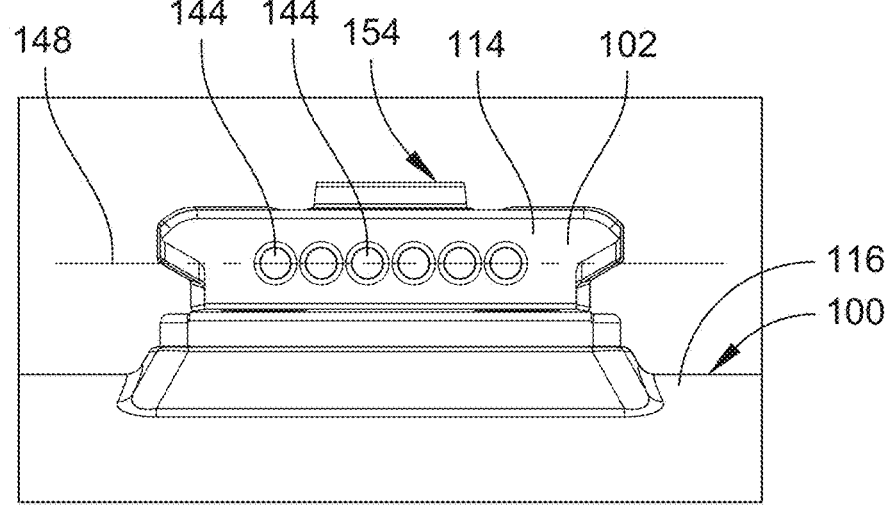

FIG. 5 is a side elevation view of the attachment mount illustrated in FIG. 4.

Figure 6:
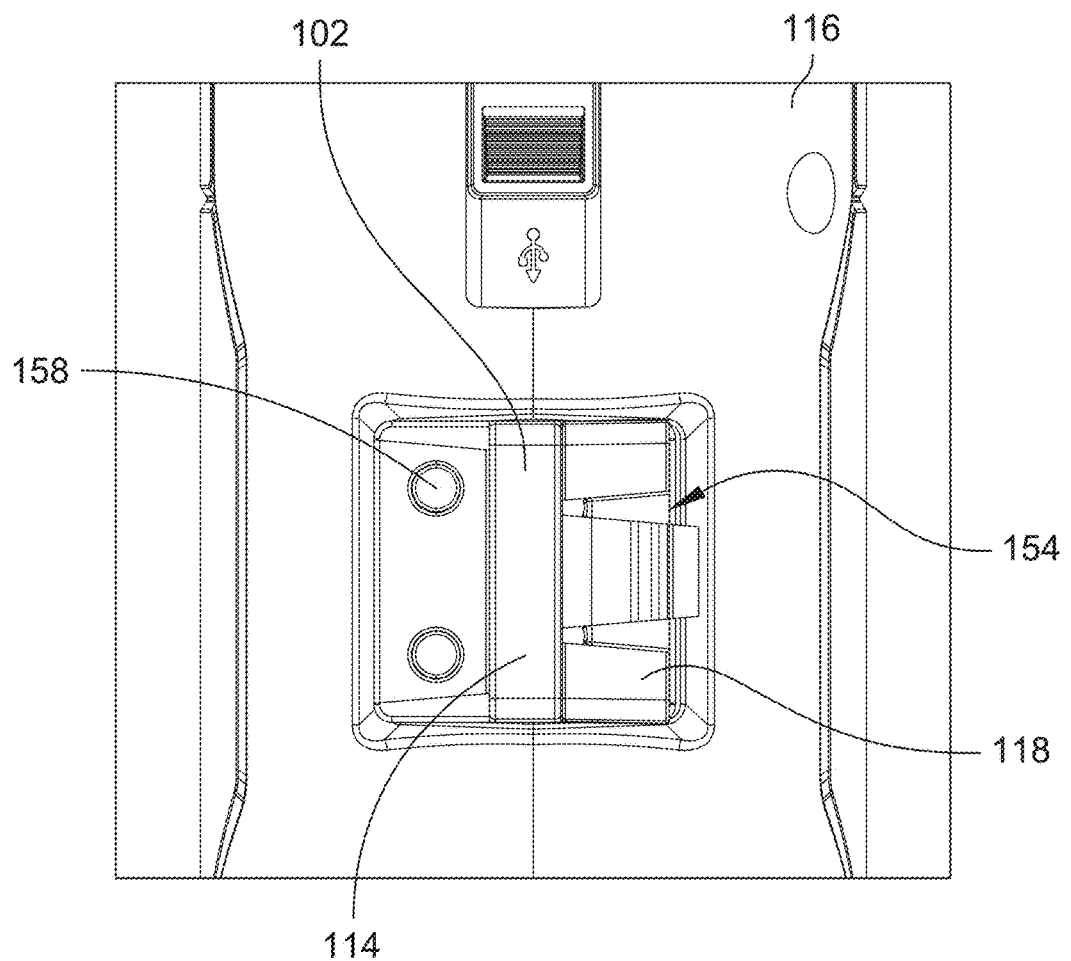

FIG. 6 is a top plan view of the attachment mount illustrated in FIG. 4.

Figure 7:
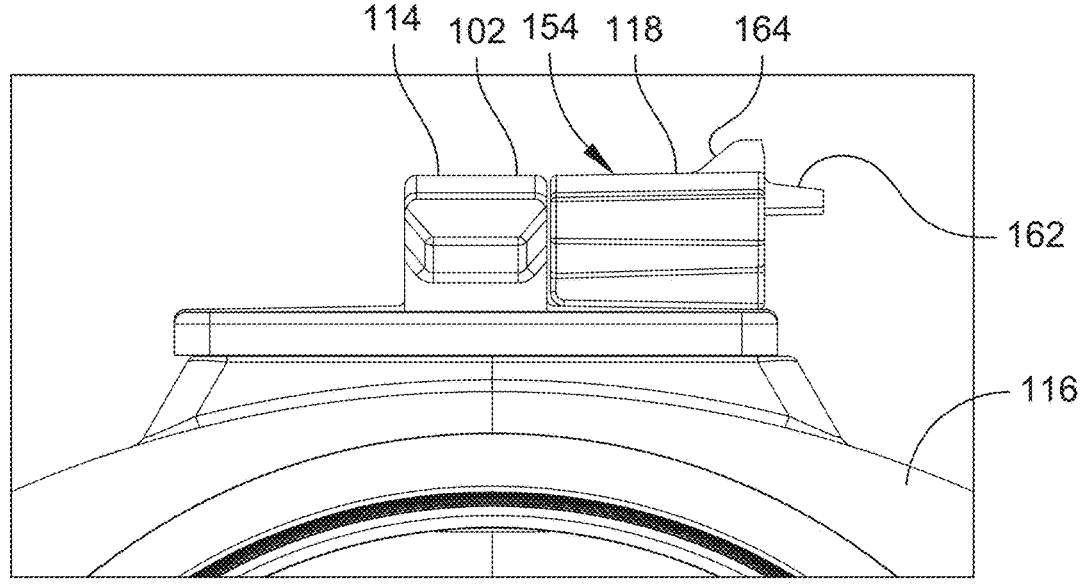

FIG. 7 is a front elevation view of the attachment mount illustrated in FIG. 4.

Figure 8:
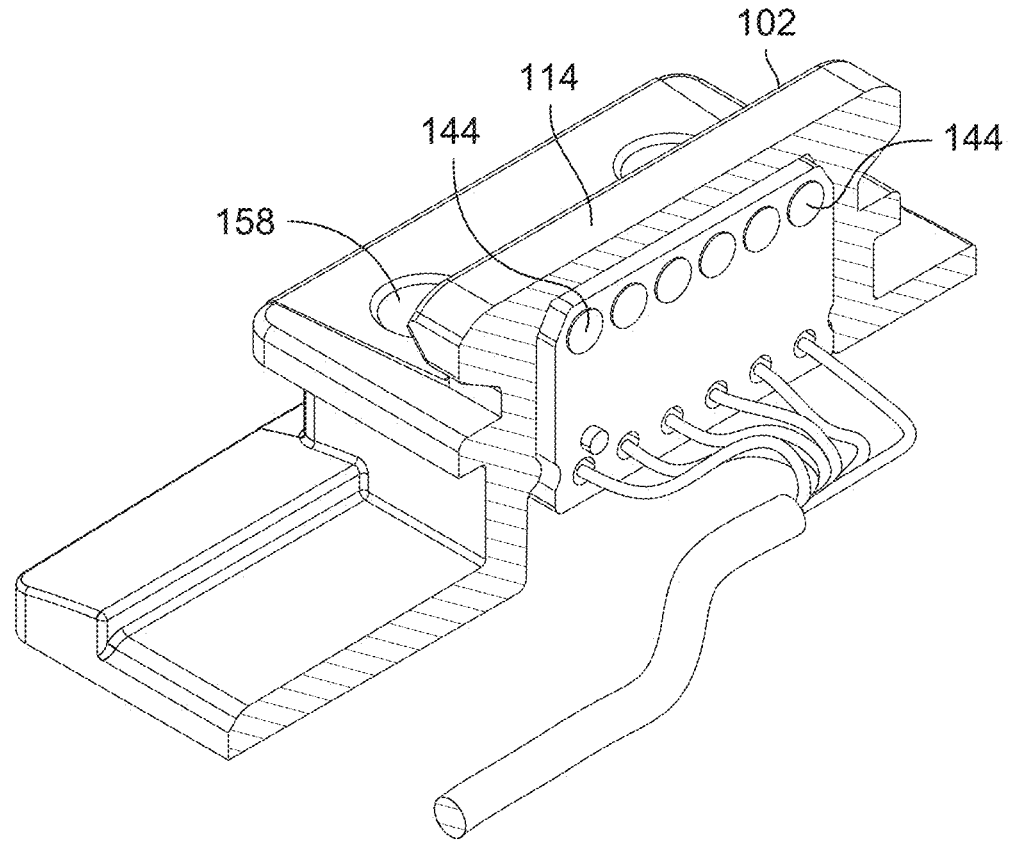

FIG. 8 is a partial cross-sectional isometric view of the attachment mount illustrated in FIG. 4.

Figure 1:
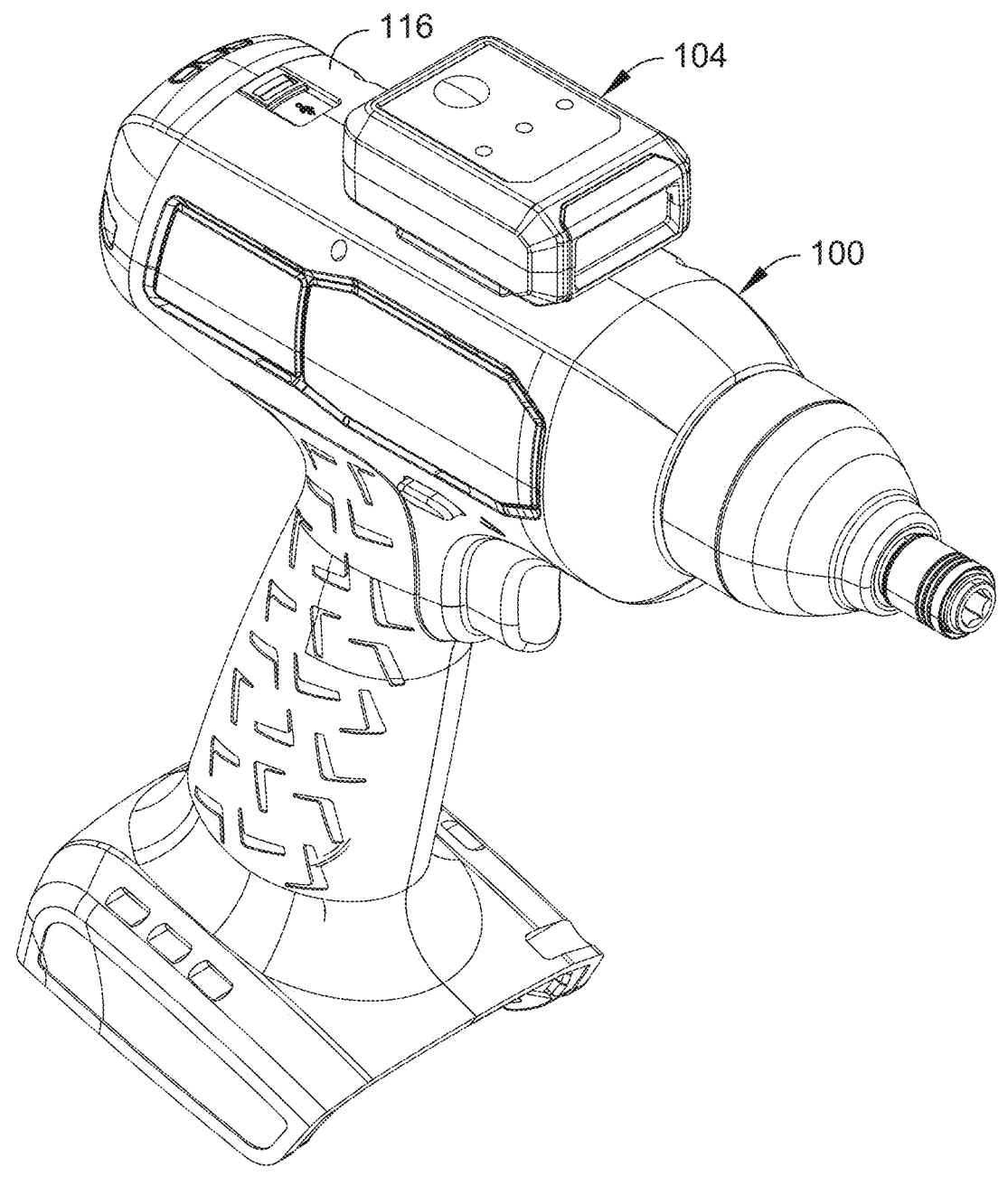
Figure 2:
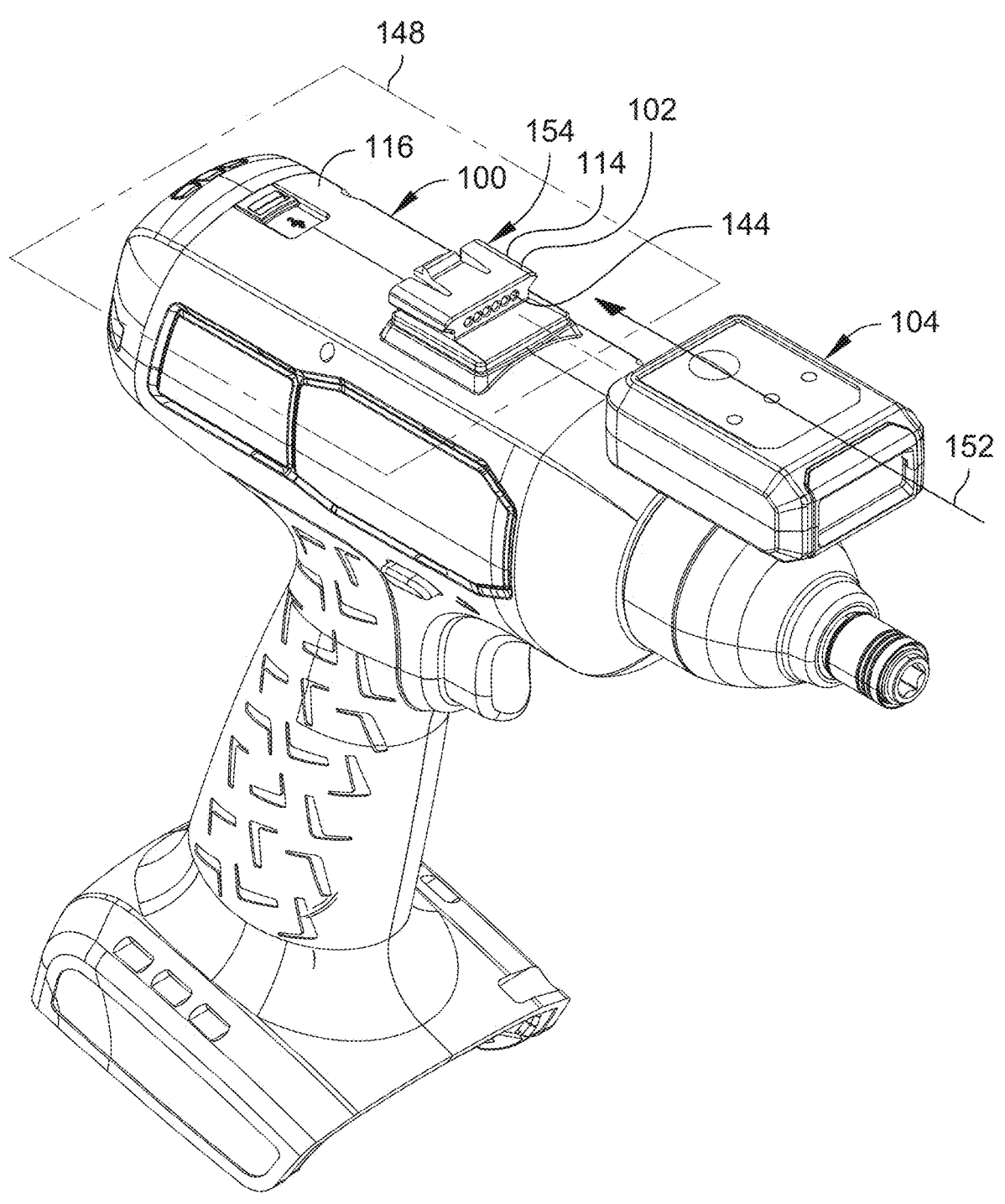
FIG. 2 is an exploded isometric view of the power tool assembly and the tool accessory illustrated in FIG. 1.
Figure 3:
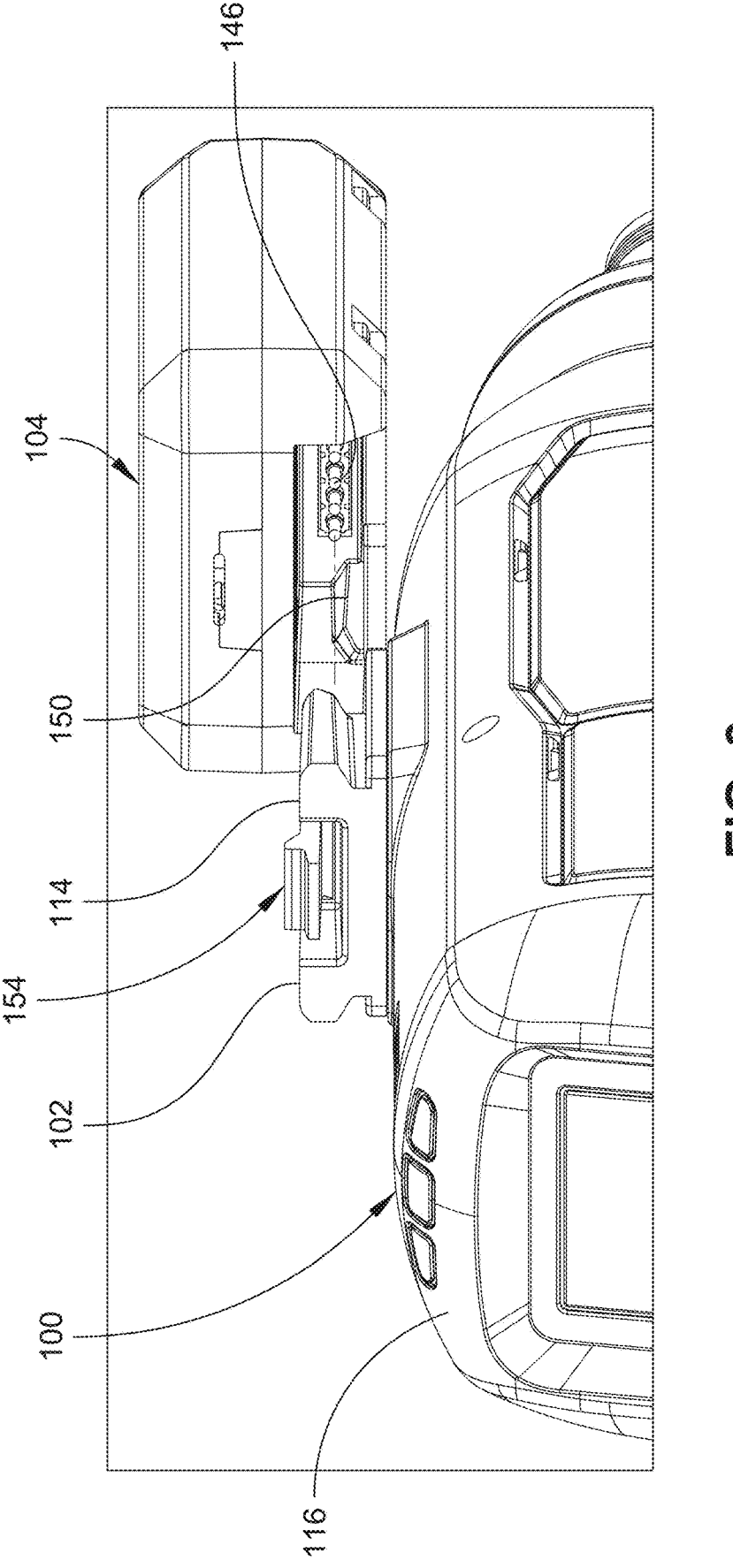
FIG. 3 is a partial exploded perspective view of the power tool assembly and the tool accessory illustrated in FIG. 1.
Figure 9:
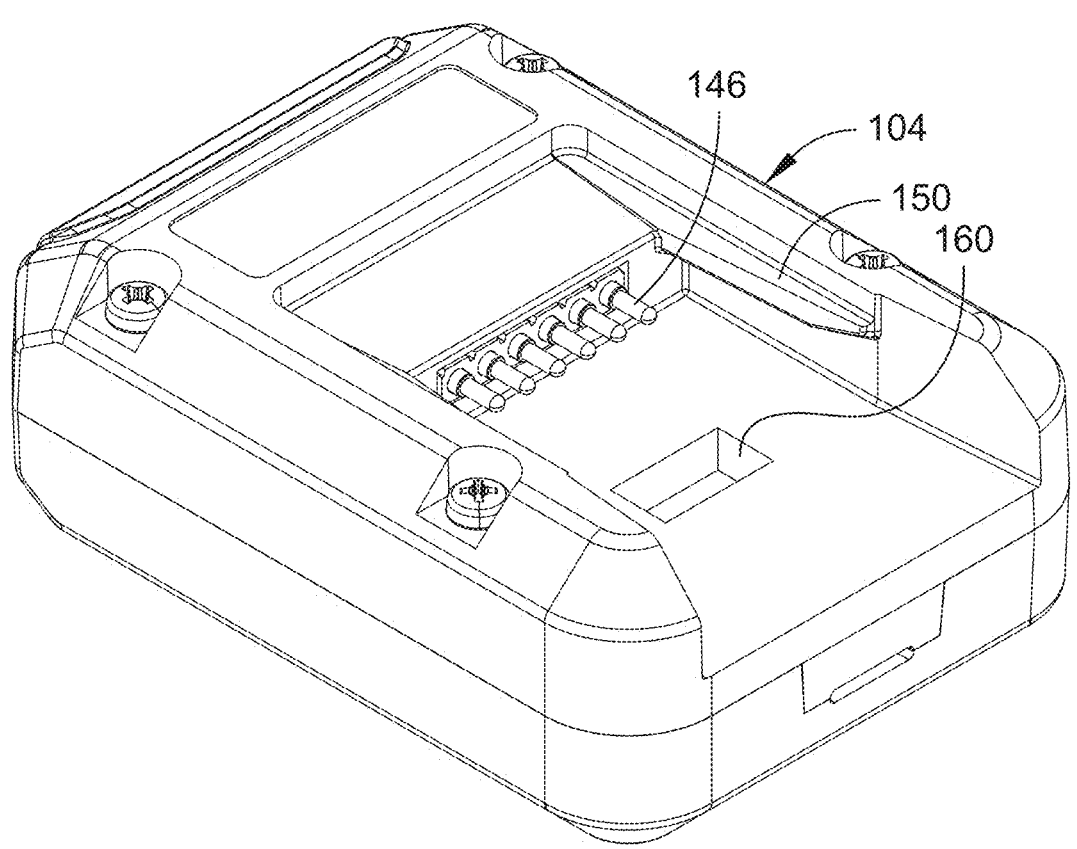

FIG. 9 is an isometric view illustrating a tool accessory for releasably attaching to a power tool assembly, such as the tool accessory for releasably attaching to the power tool assembly illustrated in FIG. 1, where the tool accessory includes electrical connectors for mating with electrical connections of an attachment mount of the power tool assembly, rails configured for sliding contact with rails of the attachment mount, and a receiver for receiving a latching mechanism of the attachment mount in accordance with example embodiments of the present disclosure.

Figure 10:
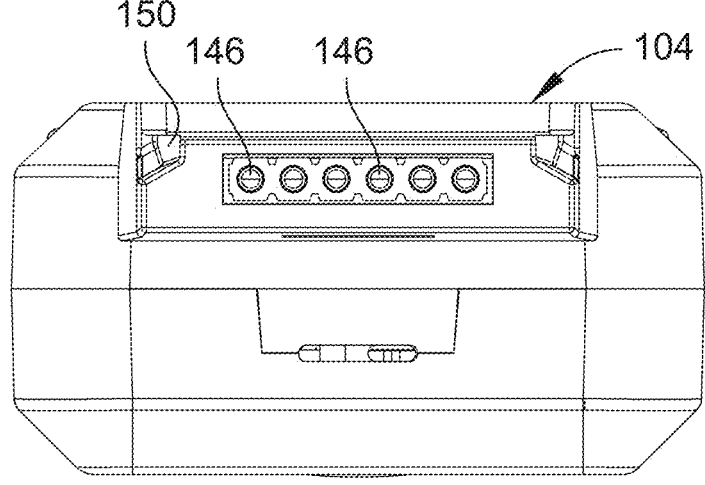

FIG. 10 is an end elevation view of the tool accessory illustrated in FIG. 9.

Figure 11:
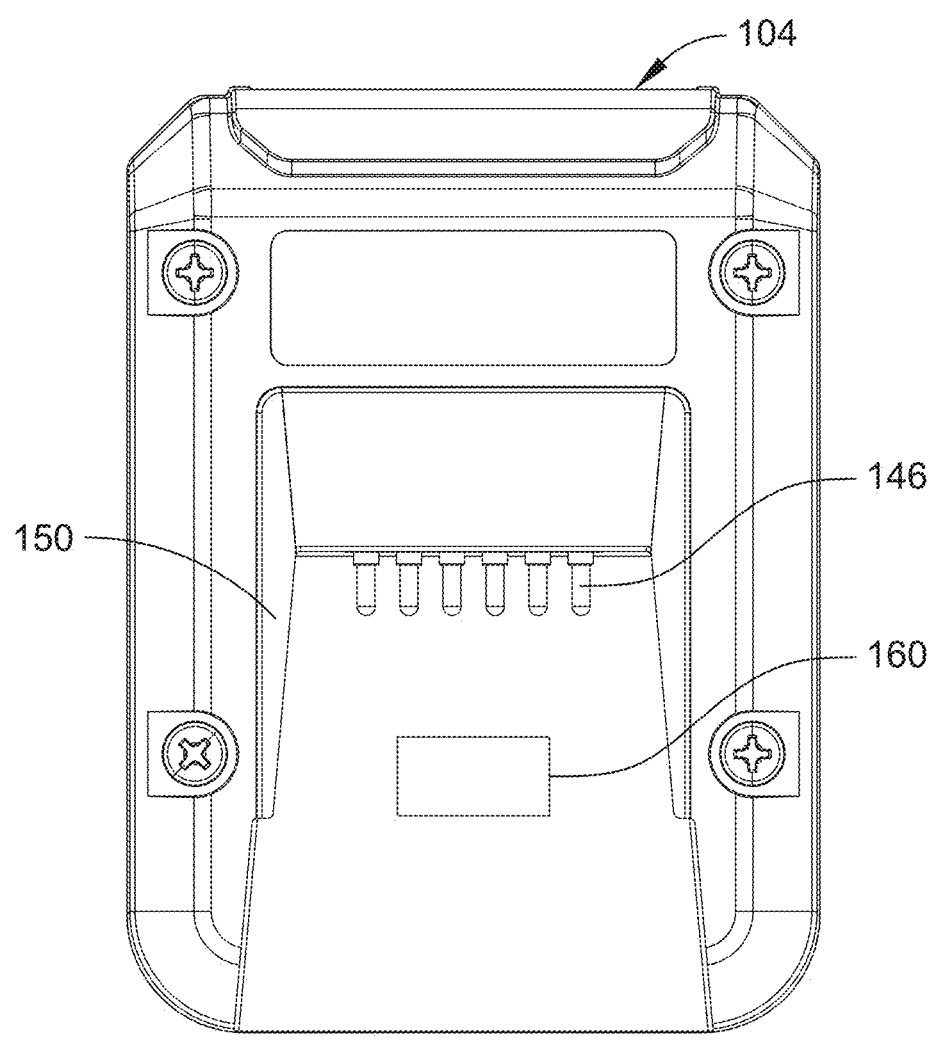

FIG. 11 is a bottom plan view of the tool accessory illustrated in FIG. 9.

Figure 12:
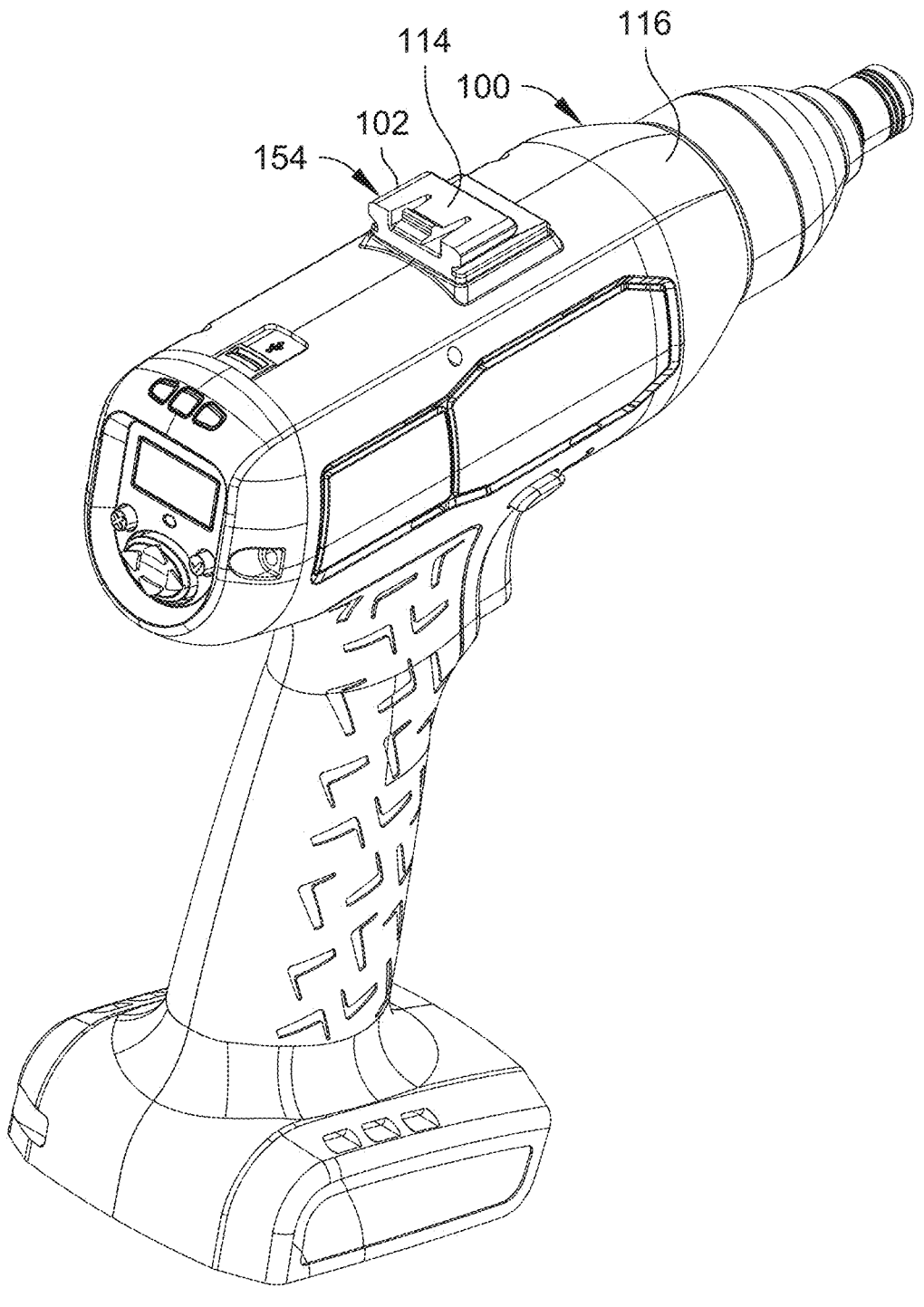

FIG. 12 is an isometric view illustrating a power tool assembly that includes a longitudinally extending housing for supporting and retaining a drive mechanism and a working tool element, an electrical connection at the housing for receiving electrical energy for the power tool assembly, and an attachment mount on the housing for releasably attaching a tool accessory to the power tool assembly; where the attachment mount protrudes outwardly from the housing and includes electrical connections for receiving mating electrical connectors of the tool accessory, rails extending along a plane generally parallel with respect to the longitudinal extension of the housing, the rails configured for sliding contact with rails of the tool accessory when the tool accessory is connected to the attachment mount, and a latching mechanism for releasably securing the tool accessory to the attachment mount in accordance with example embodiments of the present disclosure.

Figure 13:
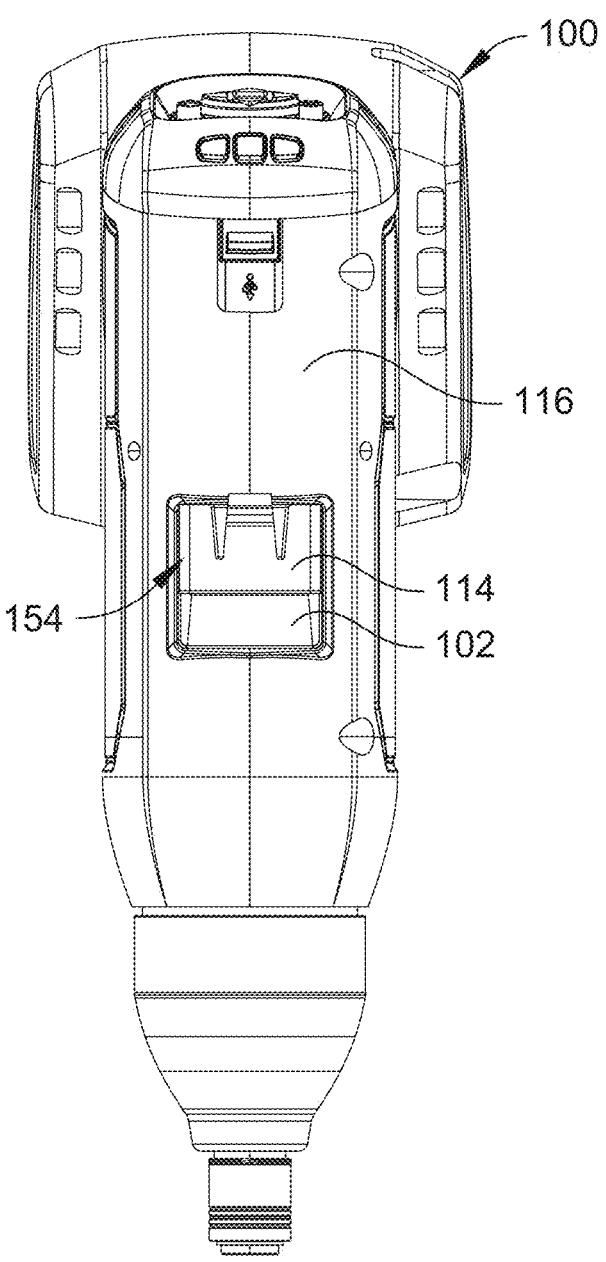

FIG. 13 is a top plan view of the power tool assembly illustrated in FIG. 12.

Figure 14:
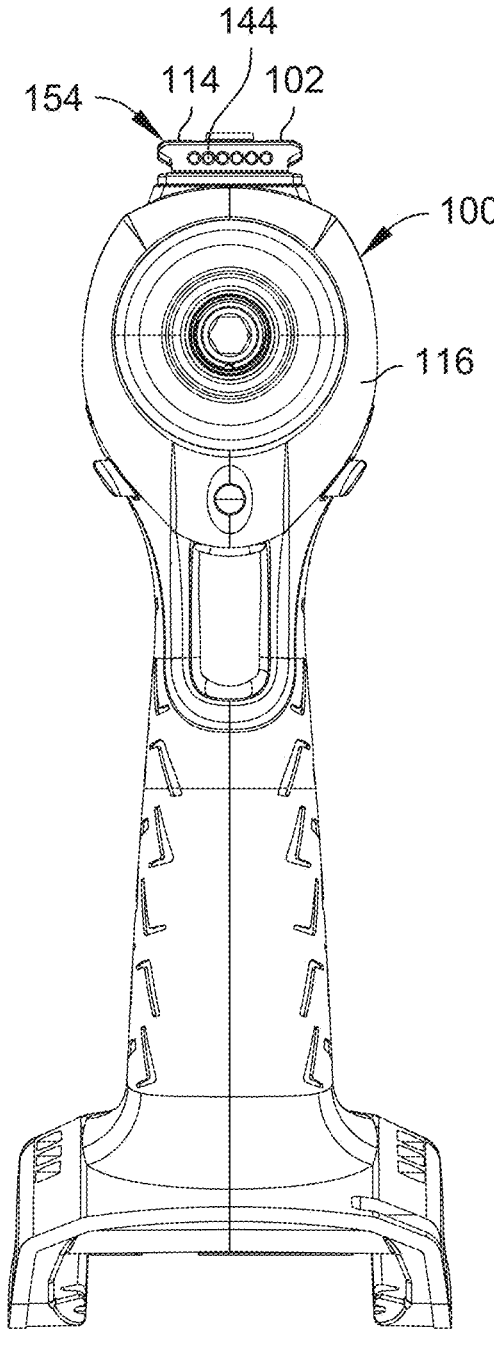

FIG. 14 is a front elevation view of the power tool assembly illustrated in FIG. 12.

Figure 15:
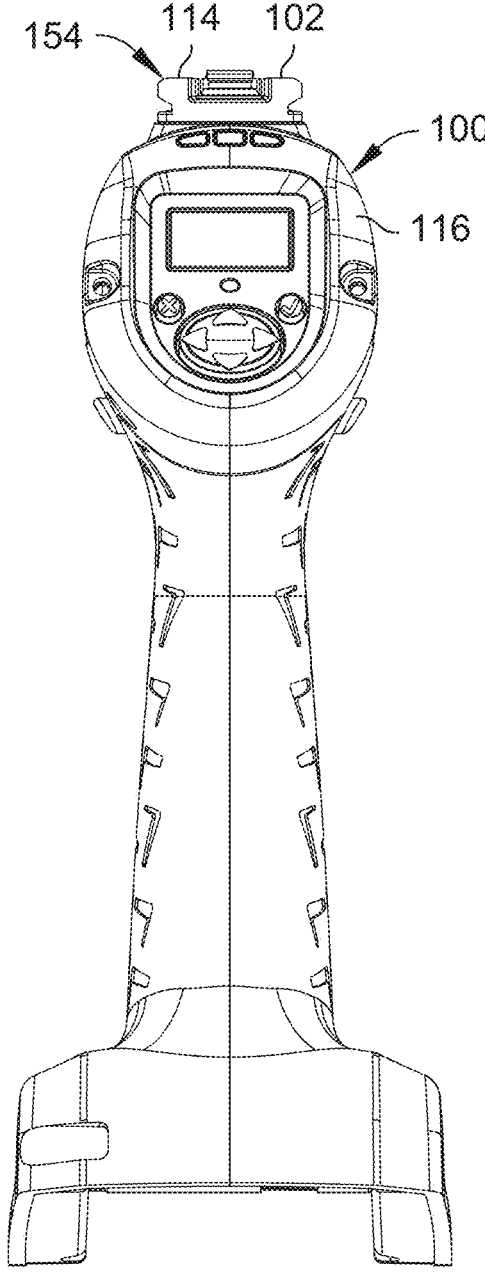

FIG. 15 is a rear elevation view of the power tool assembly illustrated in FIG. 12.

Figure 16:
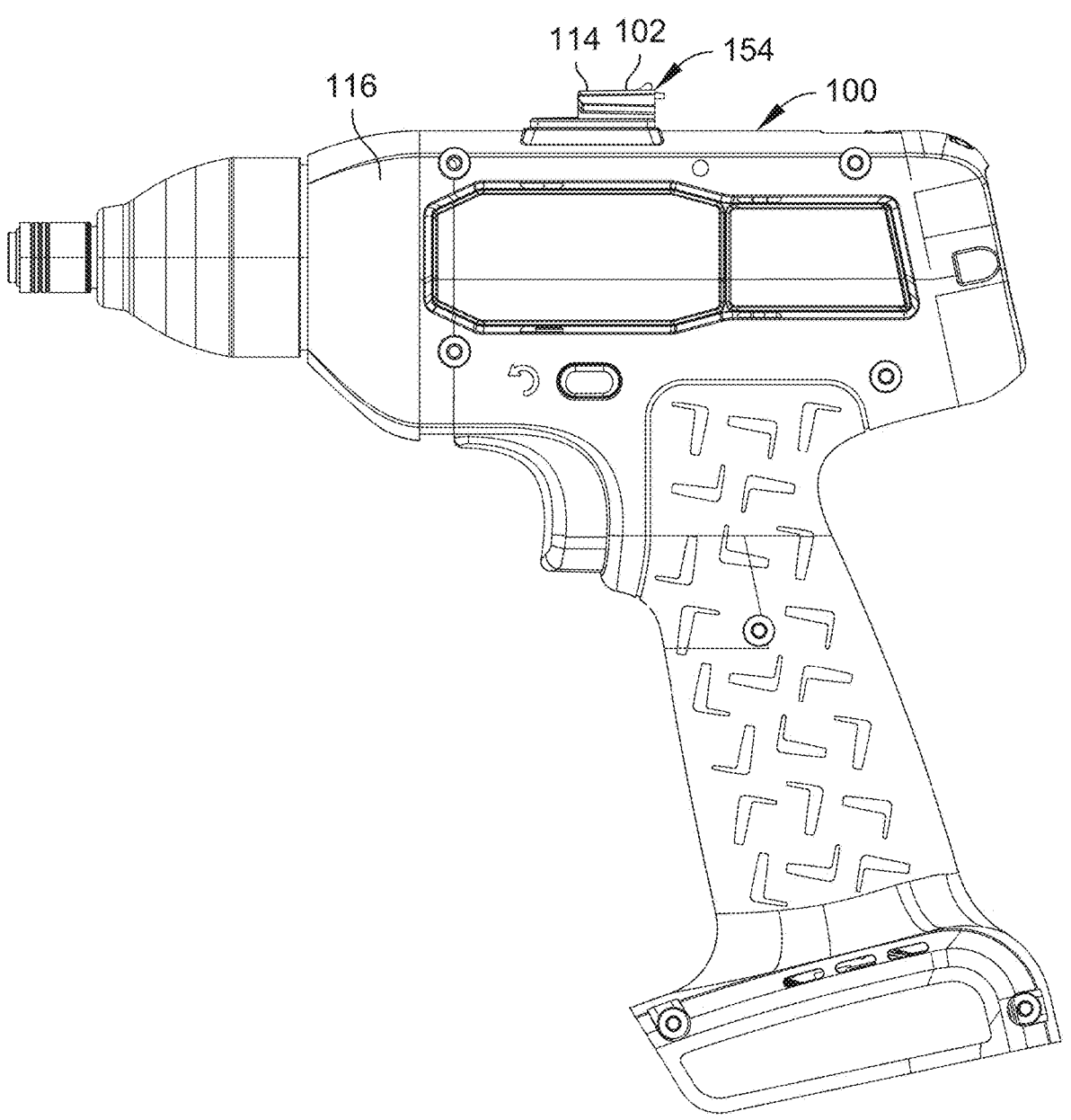

FIG. 16 is a right side elevation view of the power tool assembly illustrated in FIG. 12.

Figure 17:
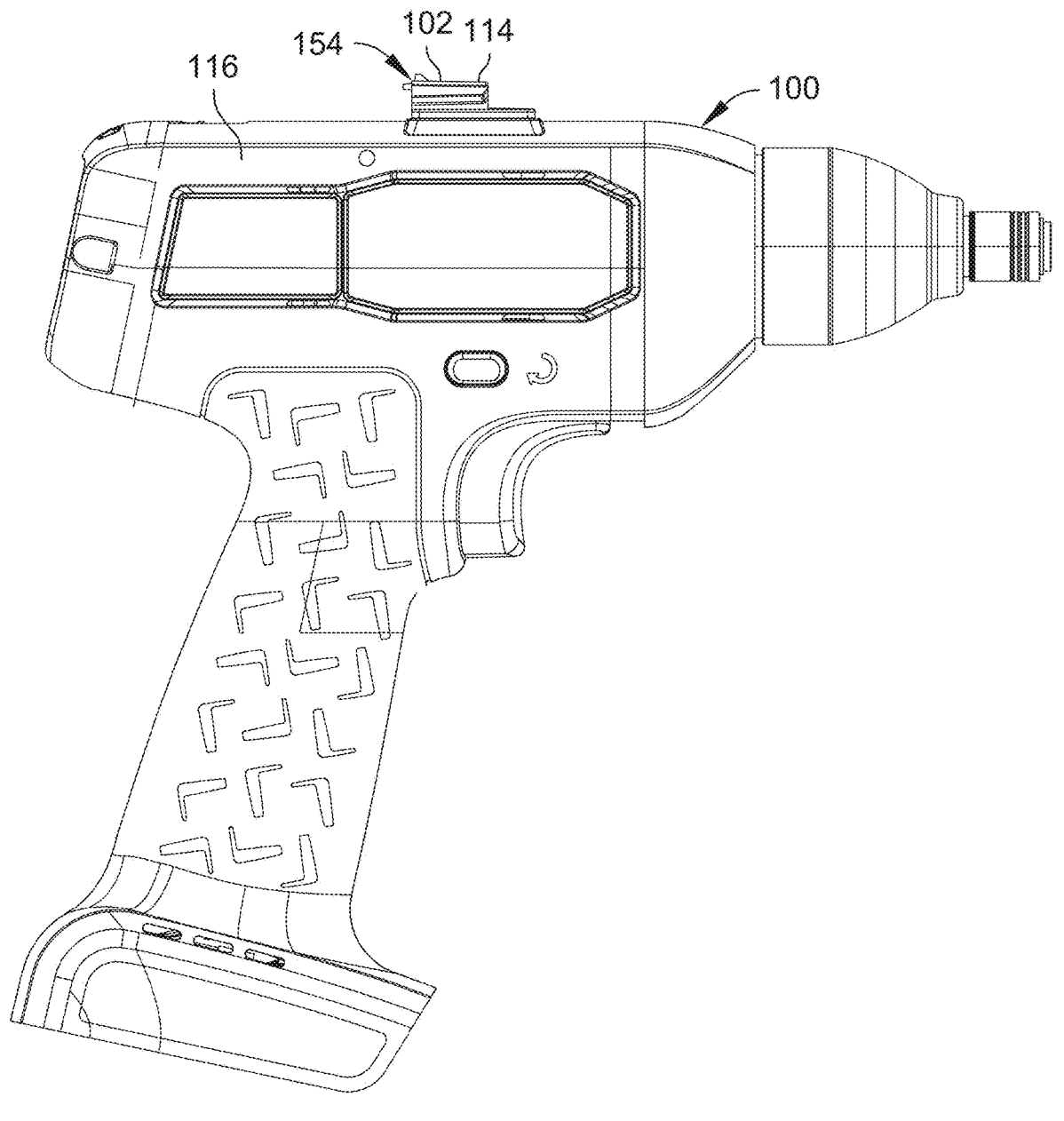

FIG. 17 is a left side elevation view of the power tool assembly illustrated in FIG. 12.

Figure 18:
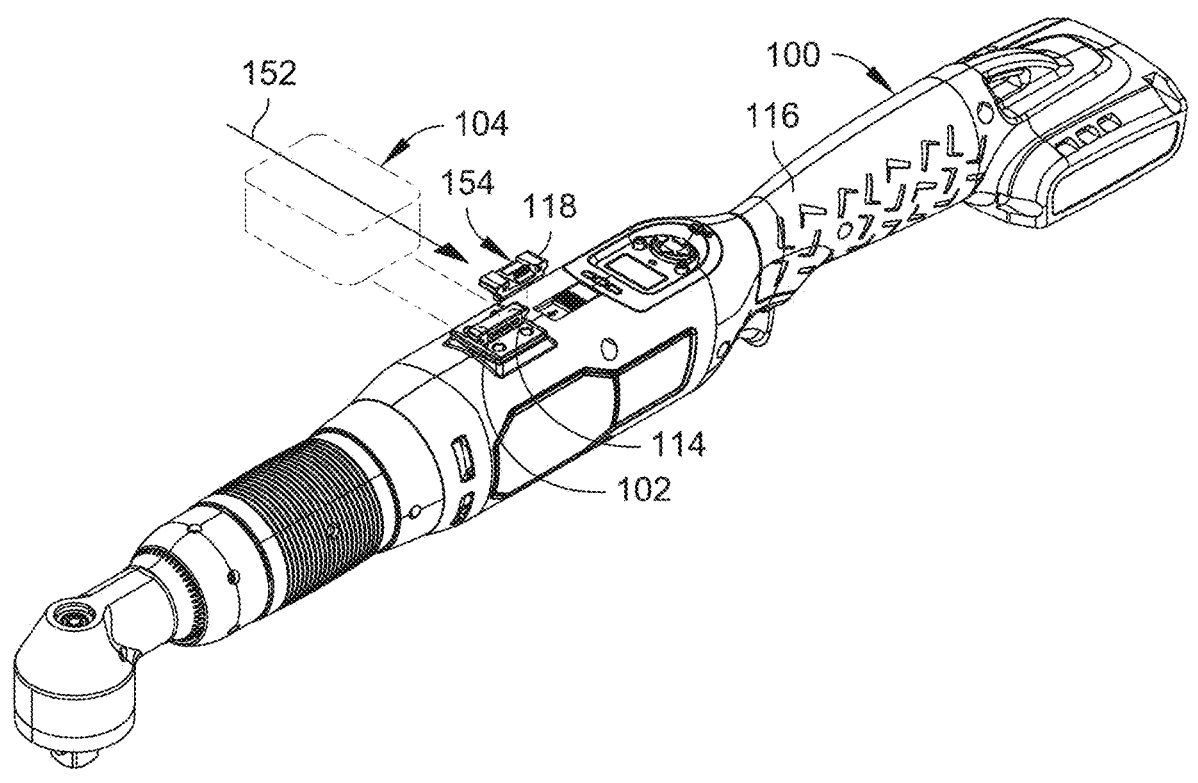

FIG. 18 is an isometric view illustrating a power tool assembly that includes a longitudinally extending housing for supporting and retaining a drive mechanism and a working tool element, an electrical connection at the housing for receiving electrical energy for the power tool assembly, and an attachment mount on the housing for releasably attaching a tool accessory to the power tool assembly; where the attachment mount protrudes outwardly from the housing and includes electrical connections for receiving mating electrical connectors of the tool accessory, rails extending along a plane generally parallel with respect to the longitudinal extension of the housing, the rails configured for sliding contact with rails of the tool accessory when the tool accessory is connected to the attachment mount, and a latching mechanism for releasably securing the tool accessory to the attachment mount; and where the latching mechanism is reversible in accordance with example embodiments of the present disclosure.

Figure 19:
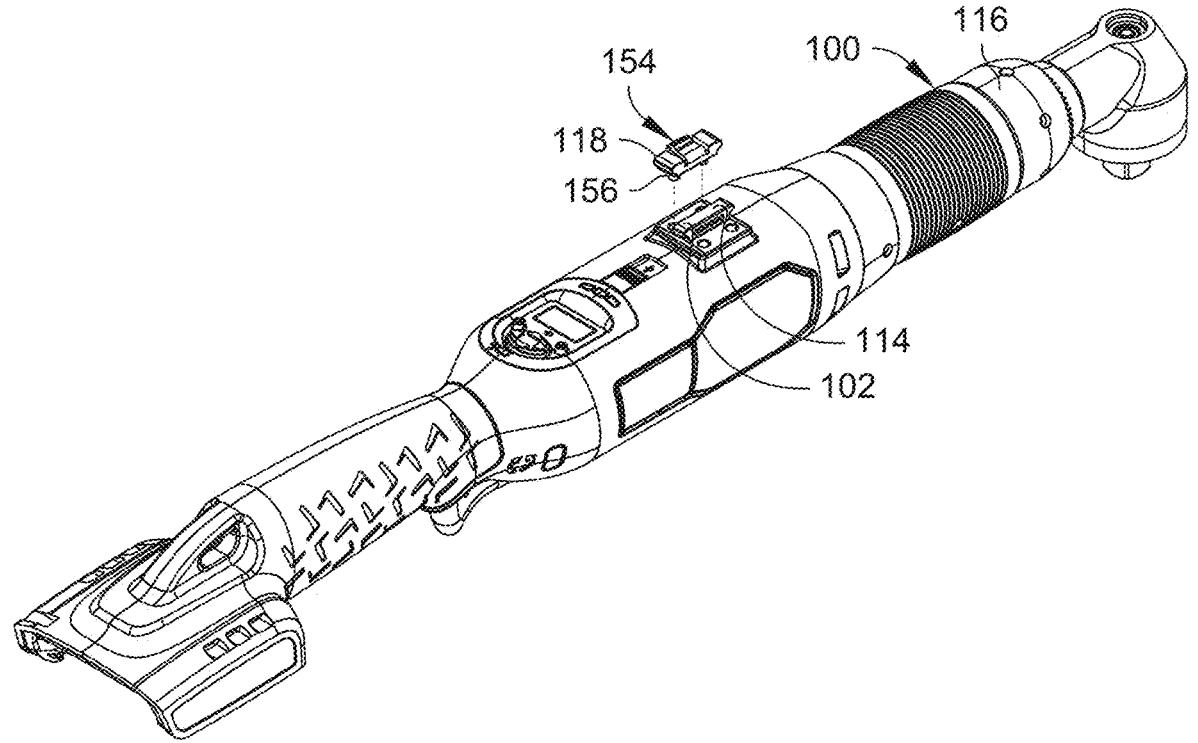
Figure 20:
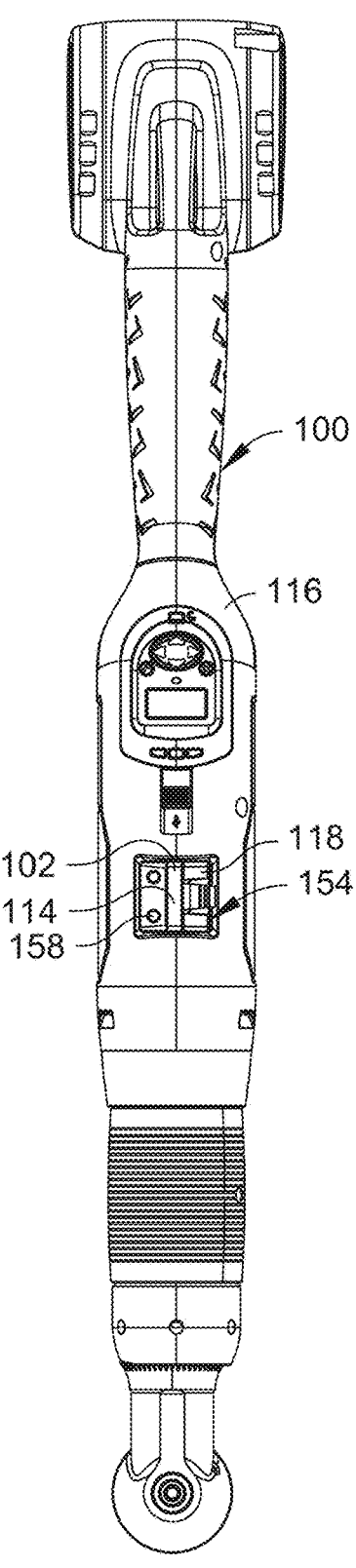

FIG. 19 is another isometric view of the power tool assembly illustrated in FIG. 20.

FIG. 20 is a top plan view of the power tool assembly illustrated in FIG. 20.

Figure 21:
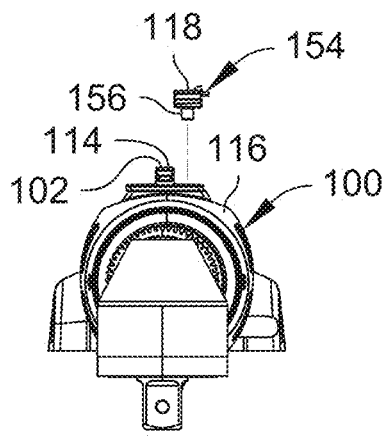

FIG. 21 is a front elevation view of the power tool assembly illustrated in FIG. 20.

Figure 22:
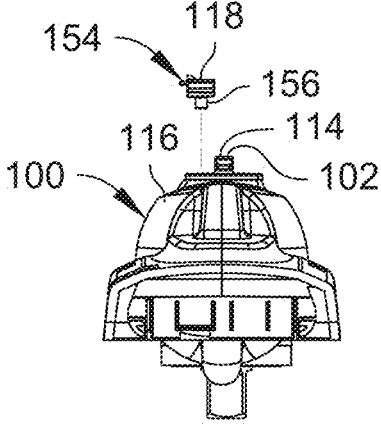

FIG. 22 is a rear elevation view of the power tool assembly illustrated in FIG. 20.

Figure 23:
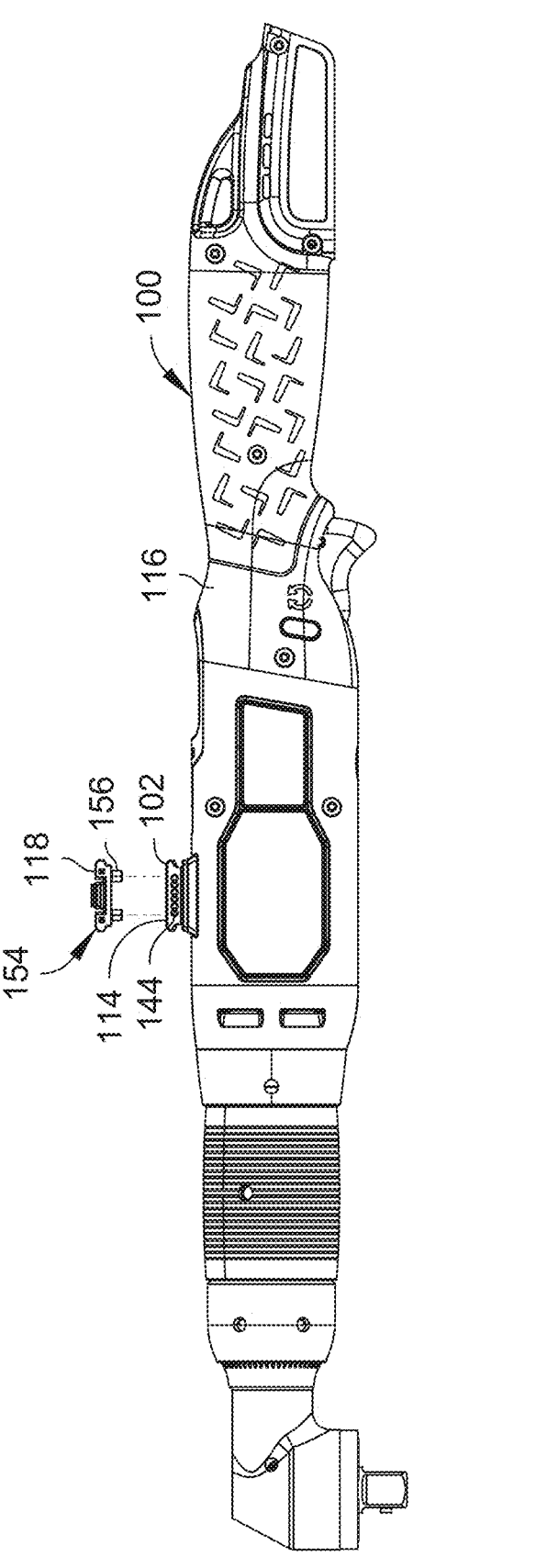

FIG. 23 is a right side elevation view of the power tool assembly illustrated in FIG. 20.

Figure 24:
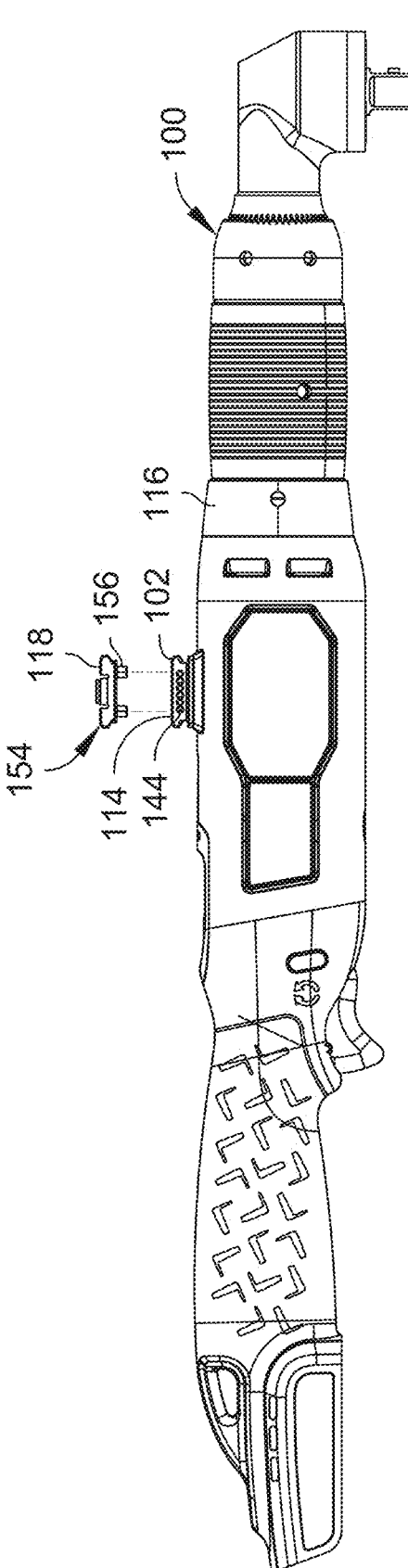

FIG. 24 is a left side elevation view of the power tool assembly illustrated in FIG. 20.

Figure 25:
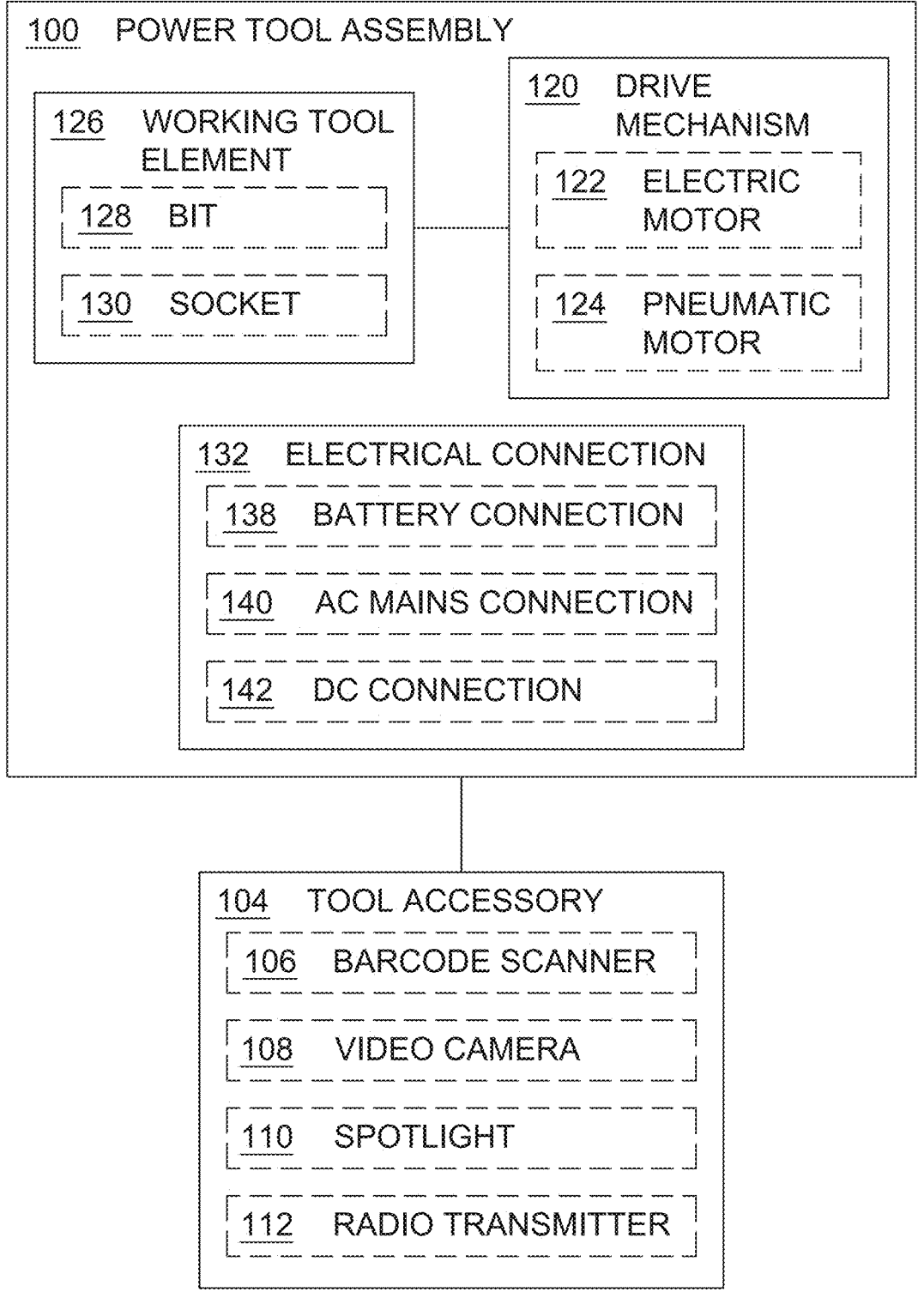

FIG. 25 is a block diagram illustrating a power tool assembly, such as the power tool assemblies illustrated in FIGS. 1 through 24, in accordance with example embodiments of the present disclosure.

DETAILED DESCRIPTION

Referring generally to FIGS. 1 through 25, power tool assemblies 100 having attachment mounts 102 for releasably attaching tool accessories 104 to the power tool assemblies 100 are described. The attachment mount 102 of a power tool assembly 100 allows for a versatile mechanical and electrical coupling between the power tool and the accessory, thus allowing a user to selectively attach a variety of tool accessories 104, such as a detachable barcode scanner 106, video camera 108, light (e.g., spotlight 110), radio transmitter 112, etc. to the power tool assembly 100, which may optionally transfer power and/or mono- or bi-directional data between the tool accessory 104 and the power tool assembly 100.

The attachment mount 102 of the power tool assembly 100 includes a low-profile rail 114 proximate to the housing 116 of the power tool, allowing the tool accessory 104 to be mounted onto the power tool assembly 100 by sliding and securing the accessory onto rail(s) 114 of the attachment mount 102. The attachment mount 102 can be reversible to allow forward- or rearward-sliding tool accessories 104 to be attached to a power tool assembly 100, or, in other instances, allow for transverse (i.e., leftward or rightward) sliding tool accessories 104 to accommodate left- and right-handed users. This further allows for an ergonomic benefit where the tool accessory 104 may be swappable between left- or right-facing directions on an angle tool, such as a nut runner, thus allowing for improved ease of use and reduced operator fatigue.

In some instances, the attachment mount 102 utilizes a detachable latching mechanism 118 (e.g., clip) to allow for alternative mount configurations, where the clip is designed to permit toolless or tool-required removal of the tool accessory 104. In instances when a user does not wish to attach a tool accessory 104 to the power tool assembly 100, the attachment mount 102 is modular to receive a blanking plate.

In embodiments, the power tool assembly 100 includes a drive mechanism 120 (e.g., an electric motor 122, a pneumatic motor 124) for powering a working tool element 126 (e.g., a bit 128, a socket 130), a longitudinally extending housing 116 for supporting and retaining the drive mechanism 120 and the working tool element 126, an electrical connection 132 at the housing 116 for receiving electrical energy for the power tool assembly 100, and an attachment mount 102 on the housing 116 for releasably attaching a tool accessory 104 to the power tool assembly 100. The power tool assembly 100 can be, but is not limited to, a screwdriver (e.g., an electrically powered precision screwdriver tool), a torque wrench (e.g., an electrically powered angle wrench tool), an angle grinder, a sander, a drill, and so forth. The electrical connection 132 can be, but is not limited to, a battery connection 138, an AC (alternating current) mains connection 140, or a DC (direct current) connection 142.

In embodiments, the tool accessory 104 can be, but is not limited to, a barcode scanner 106, a video camera 108, a spotlight 110 (i.e., directional light), an omnidirectional light, or a radio transmitter 112.

In some embodiments, the attachment mount 102 protrudes outwardly from the housing 116 and has a low profile (e.g., occupying a spatial envelope minimizing the extension of the attachment mount 102 from the housing 116). In embodiments, the attachment mount 102 includes multiple electrical connections 144 for receiving mating electrical connectors 146 of the tool accessory 104 when the tool accessory 104 is connected to the attachment mount 102.

In embodiments, the multiple electrical connections 144 of the attachment mount 102 are configured to transmit one or more of, electrical power to the tool accessory 104 from the electrical connection at the housing 116, data from the power tool assembly 100 to the tool accessory 104, or data from the tool accessory 104 to the power tool assembly 100. For example, in some embodiments, the tool accessory 104 can be used to scan a barcode or quick-response (QR) code representative of one or more settings for the power tool assembly 100. The information from the tool accessory 104 representative of the setting(s) can be transmitted to the power tool assembly 100 and used to set or update tool settings. For instance, in the case of a power tool assembly 100 configured as a torque wrench, settings obtained via communication between the power tool assembly 100 and the tool accessory 104 can be used to set one or more operational parameters, such as torque, revolutions-per-minute (RPM), and so forth at the power tool assembly 100.

In another example, a tool accessory 104 configured as a video camera 108 is used to capture video of an operation in progress using the tool. For example, a video camera 108 facing the forward end of the tool captures images of the tool in operation. In some embodiments, this video can be machine processed by the tool accessory 104, the power tool assembly 100, and/or a remote entity (e.g., machine) where images captured by the video camera 108 can be sent. For example, video taken by a video camera 108 can be used by the tool accessory 104, by the power tool assembly 100, and/or by a remote entity for verification and/or traceability of operations performed using the power tool. In other instances, video taken by a video camera 108 can be used by the tool accessory 104, by the power tool assembly 100, and/or by a remote entity for positioning the power tool assembly 100. This video can also be transmitted (e.g., by the tool accessory 104 and/or by the power tool assembly 100) to a third party monitoring the operations, who can provide instruction/guidance to the operator of the tool while the operation is conducted.

In embodiments, the attachment mount 102 includes one or more rails 114 that extend along a plane 148 generally parallel with respect to the longitudinal extension of the housing 116. In this embodiment, the rail(s) 114 are configured for sliding contact with one or more rails 150 of the tool accessory 104 when the tool accessory 104 is connected to the attachment mount 102 to restrict movement of the tool accessory 104 in directions other than a sliding direction 152 of the tool accessory 104 onto the attachment mount 102.

In embodiments, the attachment mount 102 includes a latching mechanism 154 for releasably securing the tool accessory 104 to the attachment mount 102 and restricting movement of the tool accessory 104 in the sliding direction 152 of the tool accessory 104 onto the attachment mount 102. In some embodiments, the latching mechanism 154 is a component that is detachable from the attachment mount 102 on the housing 116. With reference to FIGS. 4 through 7 and 18 through 24, the latching mechanism 154 can be a clip that includes one or more pins 156 to be received by corresponding recesses 158 in the housing 116. In further embodiments, the housing 116 can have multiple sets of recesses 158 that permit various positions for receiving the clip and its associated pins 156. As described, the tool accessory 104 is interchangeable with other tool accessories 104, e.g., for successively attached barcode scanner 106, video camera 108, and so forth.

In embodiments, the multiple electrical connections 144 of the attachment mount 102 are configured to receive electrical connectors 146 of the tool accessory 104 that extend in a plane 148 generally parallel with respect to the longitudinal extension of the housing 116.

In some embodiments, the sliding direction 152 of the tool accessory 104 onto the attachment mount 102 is generally parallel to the longitudinal extension of the housing 116, e.g., for a forward-facing tool accessory 104, such as a video camera 108. In some embodiments, the sliding direction 152 of the tool accessory 104 onto the attachment mount 102 is generally perpendicular to the longitudinal extension of the housing 116, e.g., for a side-facing tool accessory 104, such as a barcode scanner 106. In some embodiments, the sliding direction 152 of the tool accessory 104 onto the attachment mount 102 is reversible, e.g., using a detachable latching mechanism 118, such as the reversible clip previously described. Thus, the latching mechanism 154 for the tool accessory 104 on the attachment mount 102 can be reversible with respect to the multiple electrical connections 144.

In an example where the tool accessory 104 is a barcode scanner 106, the user of the power tool assembly 100 desires to place the barcode scanner 106 at an appropriate distance from a barcode in order to properly scan the barcode. With a pistol-grip tool (e.g., as illustrated in FIGS. 1 through 3 and 12 through 17, a forward-facing tool accessory 104 may place the barcode scanner 106 at an appropriate distance when held by the user. However, with an angle tool (e.g., as illustrated in FIGS. 4 through 7 and 18 through 24, the length of the tool needed to allow the user to react to the torque generated through the tool may place the tool accessory 104 sufficiently far from the ends of the power tool assembly 100 to prevent the user from bringing the tool to an appropriate distance when the tool accessory 104 faces an end of the tool. Thus, in this example, the attachment mount 102 can be oriented such that the tool accessory 104 faces a direction perpendicular to the longitudinal extension of the tool, i.e., in a side-facing manner.

In embodiments, the tool accessory 104 includes multiple electrical connectors 146 for mating with electrical connections 144 of the attachment mount 102 when the tool accessory 104 is connected to the attachment mount 102. In some embodiments, the multiple electrical connectors 146 of the tool accessory 104 are spring-biased pins (e.g., pogo pins) that mate with corresponding electrical connections 144 of the attachment mount 102 (e.g., contact pads on a printed circuit board (PCB)). In this example, the electrical connections 144 of the attachment mount 102 can be located in recesses or holes (i.e., blind holes) that receive the spring-biased pins and guide the pins into contact with the contact pads. In embodiments, the multiple electrical connectors 146 of the tool accessory 104 are configured to transmit one or more of, electrical power to the tool accessory 104 from the electrical connection at the housing 116, data from the tool accessory 104 to the power tool assembly 100, or data from the power tool assembly 100 to the tool accessory 104.

In embodiments, the tool accessory 104 includes one or more rails 150 configured for sliding contact with the one or more rails 114 of the attachment mount 102 that extend along a plane 148 generally parallel with respect to the longitudinal extension of the housing 116. In embodiments, the rails 114 and 150 are configured to restrict movement of the tool accessory 104 in directions other than the sliding direction 152 of the tool accessory 104 onto the attachment mount 102, e.g., as previously described.

In embodiments, the tool accessory 104 includes a receiver 160 (e.g., a notch, a recess, a hole, a protrusion or tooth, a detent, etc.) for receiving the latching mechanism 154 of the attachment mount 102 for releasably securing the tool accessory 104 to the attachment mount 102 and restricting movement of the tool accessory 104 in the sliding direction 152 of the tool accessory 104 onto the attachment mount 102, e.g., as previously described. In some embodiments, the latching mechanism 154 includes a biased lever 162 having a ramp 164 that is angled to snap into position in a corresponding receiving recess receiver 160 of the tool accessory 104. For example, the clip can be an injection molded plastic clip having a cantilevered arm lever 162 with an angled ramp 164, where the cantilevered arm is biased into a parallel extension with respect to the sliding direction 152 of the tool accessory 104 onto the attachment mount 102. The sliding action causes deflection of the cantilevered beam and subsequent return to its neutral position when captured by the receiver 160 of the tool accessory 104. In embodiments, the clip can be made from a tough nylon material, such as a non-glass filled nylon, highly impact modified nylon, etc. In some embodiments, an auxiliary tool, such as the blade of a screwdriver may be needed to release the tool accessory 104 from the attachment mount 102.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power tool assembly comprising:
   a drive mechanism for powering a working tool element;
   a longitudinally extending housing for supporting and retaining the drive mechanism and the working tool element;
   an electrical connection at the housing for receiving electrical energy for the power tool assembly;
   a tool accessory including a plurality of electrical connectors and at least one tool accessory rail;
   an attachment mount on the housing for releasably attaching the tool accessory to the power tool assembly, the attachment mount protruding outwardly from the housing and including
      a plurality of electrical connections for mating with the plurality of electrical connectors of the tool accessory when the tool accessory is connected to the attachment mount, the plurality of electrical connections for at least one of transmitting electrical power to the tool accessory from the electrical connection at the housing, transmitting data to the tool accessory, or receiving data from the tool accessory,
      at least one attachment mount rail extending along a plane generally parallel with respect to the longitudinal extension of the housing, the attachment mount rail configured for sliding contact with the tool accessory rail of the tool accessory when the tool accessory is connected to the attachment mount to restrict movement of the tool accessory in directions other than a sliding direction of the tool accessory onto the attachment mount, and a latching mechanism for releasably securing the tool accessory to the attachment mount and restricting movement of the tool accessory in the sliding direction of the tool accessory onto the attachment mount, wherein the tool accessory is interchangeable with other tool accessories.

2. The power tool assembly as recited in claim 1, wherein the plurality of electrical connections are configured to receive electrical connectors of the tool accessory that extend in the plane generally parallel with respect to the longitudinal extension of the housing.

3. The power tool assembly as recited in claim 1, wherein the sliding direction of the tool accessory onto the attachment mount is generally parallel to the longitudinal extension of the housing.

4. The power tool assembly as recited in claim 1, wherein the sliding direction of the tool accessory onto the attachment mount is generally perpendicular to the longitudinal extension of the housing.

5. The power tool assembly as recited in claim 1, wherein the sliding direction of the tool accessory onto the attachment mount is reversible.

6. The power tool assembly as recited in claim 1, wherein the latching mechanism of the tool accessory onto the attachment mount is reversible with respect to the plurality of electrical connections.

7. The power tool assembly as recited in claim 1, wherein the tool accessory is at least one of a barcode scanner, a video camera, or a spotlight.

8. A power tool assembly comprising:

a drive mechanism for powering a working tool element;

a longitudinally extending housing for supporting and retaining the drive mechanism and the working tool element;

an electrical connection at the housing for receiving electrical energy for the power tool assembly; and an attachment mount on the housing for releasably attaching a tool accessory to the power tool assembly, the attachment mount protruding outwardly from the housing and including a plurality of electrical connections for receiving mating electrical connectors of the tool accessory when the tool accessory is connected to the attachment mount, the plurality of electrical connections for at least one of transmitting electrical power to the tool accessory from the electrical connection at the housing, transmitting data to the tool accessory, or receiving data from the tool accessory, at least a first rail extending along a plane generally parallel with respect to the longitudinal extension of the housing, the first rail configured for sliding contact with at least a second rail of the tool accessory when the tool accessory is connected to the attachment mount to restrict movement of the tool accessory in directions other than a sliding direction of the tool accessory onto the attachment mount, and a latching mechanism for releasably securing the tool accessory to the attachment mount and restricting movement of the tool accessory in the sliding direction of the tool accessory onto the attachment mount, wherein the tool accessory is interchangeable with other tool accessories.

9. The power tool assembly as recited in claim 8, wherein the plurality of electrical connections are configured to receive electrical connectors of the tool accessory that extend in the plane generally parallel with respect to the longitudinal extension of the housing.

10. The power tool assembly as recited in claim 8, wherein the sliding direction of the tool accessory onto the attachment mount is generally parallel to the longitudinal extension of the housing.

11. The power tool assembly as recited in claim 8, wherein the sliding direction of the tool accessory onto the attachment mount is generally perpendicular to the longitudinal extension of the housing.

12. The power tool assembly as recited in claim 8, wherein the sliding direction of the tool accessory onto the attachment mount is reversible.

13. The power tool assembly as recited in claim 8, wherein the latching mechanism of the tool accessory onto the attachment mount is reversible with respect to the plurality of electrical connections.

14. The power tool assembly as recited in claim 8, wherein the tool accessory is at least one of a barcode scanner, a video camera, or a spotlight.

15. A tool accessory for releasably attaching to a power tool assembly, the power tool assembly including a longitudinally extending housing, an electrical connection at the housing for receiving electrical energy for the power tool assembly, and an attachment mount on the housing for releasably securing the tool accessory to the power tool assembly, the tool accessory comprising:

a plurality of electrical connectors for mating with electrical connections of the attachment mount when the tool accessory is connected to the attachment mount, the plurality of electrical connectors for at least one of transmitting electrical power to the tool accessory from the electrical connection at the housing, transmitting data to the tool accessory, or receiving data from the tool accessory;

at least one tool accessory rail configured for sliding contact with at least one attachment mount rail of the attachment mount extending along a plane generally parallel with respect to the longitudinal extension of the housing, the tool accessory rail configured to restrict movement of the tool accessory in directions other than a sliding direction of the tool accessory onto the attachment mount; and a receiver for receiving a latching mechanism of the attachment mount for releasably securing the tool accessory to the attachment mount and restricting movement of the tool accessory in the sliding direction of the tool accessory onto the attachment mount, wherein the tool accessory is interchangeable with other tool accessories.

16. The tool accessory as recited in claim 15, wherein the plurality of electrical connectors extend in the plane generally parallel with respect to the longitudinal extension of the housing.

17. The tool accessory as recited in claim 15, wherein the sliding direction of the tool accessory onto the attachment mount is generally parallel to the longitudinal extension of the housing.

18. The tool accessory as recited in claim 15, wherein the sliding direction of the tool accessory onto the attachment mount is generally perpendicular to the longitudinal extension of the housing.

19. The tool accessory as recited in claim 15, wherein the latching mechanism of the tool accessory onto the attachment mount is reversible with respect to the plurality of electrical connections.

20. The tool accessory as recited in claim 15, wherein the tool accessory is at least one of a barcode scanner, a video camera, or a spotlight.

\* \* \* \* \*